United States Patent [19]

Bruecker et al.

[11] Patent Number: 5,022,348
[45] Date of Patent: Jun. 11, 1991

[54] LIVESTOCK FEEDER WITH TRAVELING HOPPER

[75] Inventors: Gerald J. Bruecker; Robert W. Smith, both of Kaukauna, Wis.

[73] Assignee: Badger Northland Inc., Kaukauna, Wis.

[21] Appl. No.: 428,963

[22] Filed: Oct. 30, 1989

[51] Int. Cl.⁵ .............................................. A01K 5/02
[52] U.S. Cl. .................................................. 119/57.6
[58] Field of Search .................... 119/57.5, 57.6, 57.7

[56] References Cited

U.S. PATENT DOCUMENTS

| | | | |
|---|---|---|---|
| 2,786,447 | 3/1957 | Murray | 119/57.6 |
| 3,252,444 | 5/1966 | Haen | 119/57.6 |
| 3,342,165 | 9/1967 | Szymanski | 119/57.6 |
| 3,428,027 | 2/1969 | Haen et al. | 119/57.6 |
| 3,581,712 | 6/1971 | Ferris | 119/57.6 |
| 3,605,693 | 9/1971 | Thyberg | 119/57.6 |
| 3,718,121 | 2/1973 | Anderson | 119/57.6 |
| 3,769,937 | 11/1973 | Kanning | 119/57.6 |

*Primary Examiner*—Paul J. Hirsch
*Attorney, Agent, or Firm*—King & Schickli

[57] ABSTRACT

A livestock feeding apparatus provides continuous flow of feed to an elongated bunk utilizing a traveling hopper supported for movement along rails on an elongated frame over the bunk. The hopper includes a gate extending substantially along the full length of the bottom opening of the hopper for bulk dumping of the feed when the hopper is over one of the two dumping stations adjacent the two ends. The gate is actuated during opening and closing so as to travel along a sliding path to assure efficient delivery of the feed with a clean cut-off. Preferably, the gate moves at an acute angle to the longitudinal axis of the hopper and along an arc defined by pivotal support links. Cam wheels adjacent the ends of the hopper engage ramps for opening and closing the gate as the gate moves along an arcuate path defined by the parallelogram linkage. In the preferred embodiment, the wheels drop off the top of the ramps providing sudden release for rapid and secure closing of the gate. A 20° angle for the sliding path of movement of the gate is preferred and a wiper cleans the gate during opening and closing. The feed conveyor, the driving motor and sprocket and the actuating ramps are all centrally located at the mid-point of the apparatus.

16 Claims, 4 Drawing Sheets

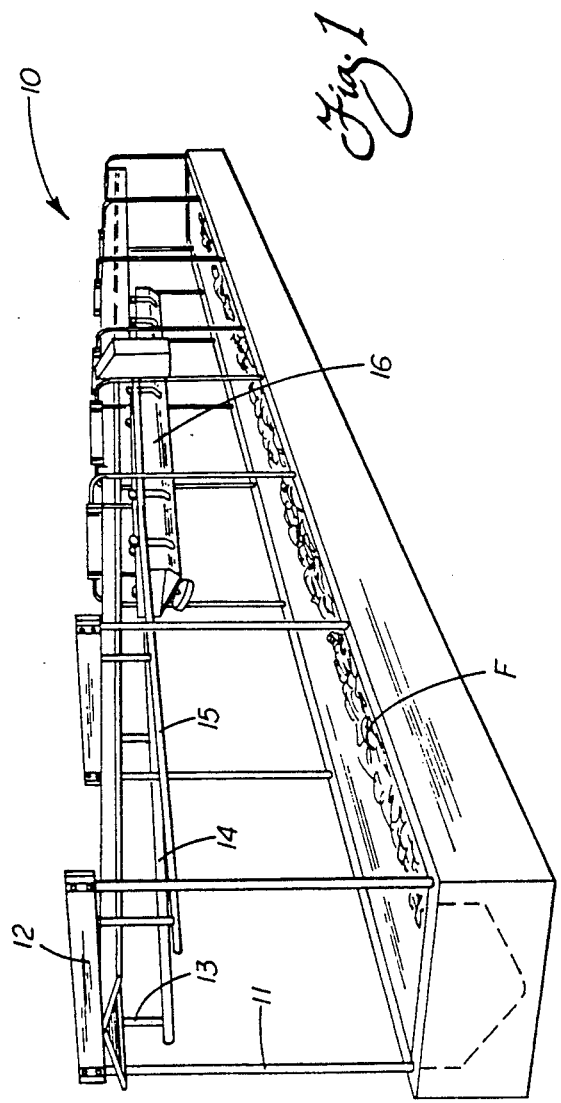
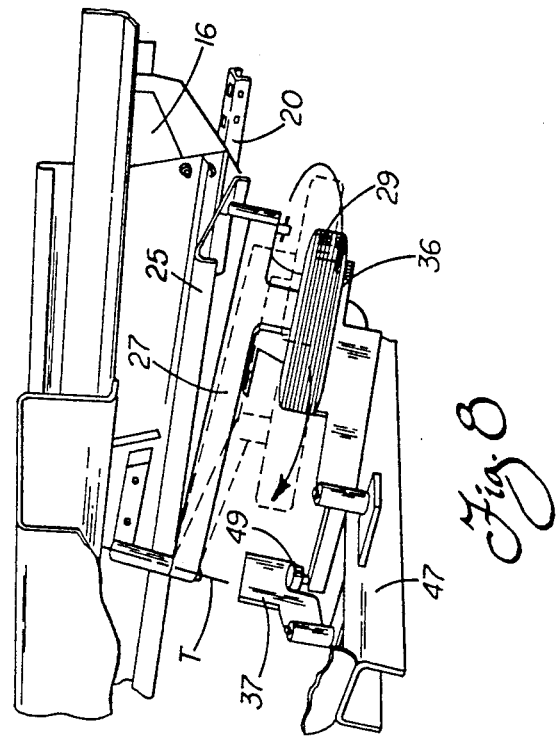
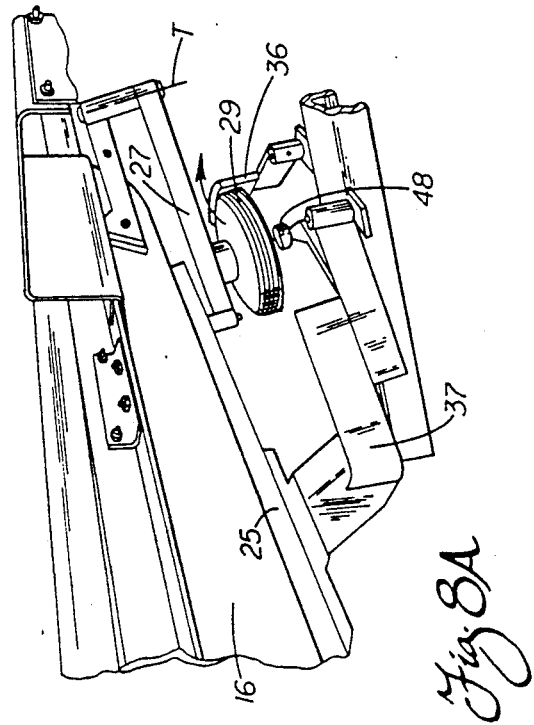

LIVESTOCK FEEDER WITH TRAVELING HOPPER

BACKGROUND OF THE INVENTION

The present invention relates to dispensing of livestock feed, and more particularly, to dispensing feed in a continuous and even manner along a bunk for feeding livestock.

The art of automatically supplying feed for livestock to a feed bunk in a feed lot or the like is generally well developed. It has long been recognized that a relatively long feed bunk must be provided for a herd of livestock in order to allow an orderly feeding operation. In this regard, it is of course the objective of the farmer to prevent livestock fighting for position at feed time and allowing the entire herd to have access to the feed on a relatively even basis. The most widely accepted practice in automatic, mechanized feeding today is to provide a traveling trough extending over the feed bunk with an active conveyor to distribute feed from one end or the other of the trough as the trough travels back and forth along the feed bunk.

As background, one of the first successful prior art arrangements for continuous feeding of this type is shown in the U.S. Pat. No. 3,366,223, to Haen, issued Jan. 30, 1968 and owned by the assignee of the present invention. The feed trough includes one-way passive dividers that push the feed from the trailing end of the traveling trough as the trough moves along the bunk. The dividers press downwardly and rearwardly in order to push the feed out the trailing end. Especially at the start of the travel at either end, when all the dividers are pushing down and rearwardly on the feed, the friction of the feed against the bottom of the trough is substantial. This requires an excessive amount of force and puts a substantial strain on the frame and other supporting components of the apparatus. Furthermore, the ends of the trough tend to be starved since the full feeding does not occur until the trough has moved several feet as the dividers drop fully down into the pushing position. Finally, the dividers may to some extent block or drag the in-feed flow from the conveyor, thus causing some unevenness of distribution in the feed bunk.

To overcome some of the shortcomings of the previous design, a different approach to moving the feed along the trough has been adopted and has met with more commercial success; Haen et al. U.S. Pat. No. 3,428,027, issued Feb. 18, 1969. In this instance, the trough is provided with an active conveyor having pushers scraping along the bottom to take the place of the passive dividers that were previously used. This improvement provides for some reduction in the friction of the feed along the bottom of the trough, and improves the even distribution of the flow to the feed bunk. However, the problem of pushing the feed along the trough, especially as the trough moves from the mid point to the end of the travel requires substantial power input and more stress loading of the components than desired.

Later attempts to change the feeding operation are characterized in the broad concept of an elongated feeding trough moving along the bunk with a bottom formed of clam shell-type doors. As the trough is positioned at the ends of travel, the clam shell doors are opened together dumping the feed in bulk into the bunk below. This concept has met with some success, as represented by the U.S. Pat. No. 3,217,693, to Loesch et al. issued Nov. 16, 1965 and U.S. Pat. No. 3,718,121, Anderson, issued Feb. 27, 1973.

However, the recognized problem in this type of apparatus is generally focused on the inability of the clam shell doors to close tightly. The feed has a tendency, especially in cold weather, to bridge across the doors. When this happens, the feed is improperly distributed along the bunk since the doors remain open as the trough traverses along its path of movement. The Anderson '121 patent suggests improvements in the door closing mechanism but fails to solve the basic problem. In so far as I am aware the attempts have all fallen short of finding an efficient, relatively low power and relatively low cost option to this prior art. As a consequence, the feeders of the Haen et al. '027 type with an active conveyor moving along a movable trough, represents the bulk of the commercial market in the farmstead industry today and for the past several decades.

Other inventors have recognized the shortcoming of the clam-shell doors of the prior art but have failed to provide efficient solutions. For example, the Kenning U.S. Pat. No. 3,769,937, issued Nov. 6, 1973 suggests eliminating the clam-shell type doors altogether by providing a trough that flips at the end of its travel beneath the in-feed conveyor. Such an approach requires increased height to allow clearance over the livestock's heads for the double height rotating trough, or alternatively substantially increased speed of operation to provide the distribution of the feed from a shallow and narrow trough. Furthermore, extended cam-/lever actuators at the end of the support frame tend to provide uncontrolled, and thus inefficient and dangerous operation of the pivoting troughs. Clearly, such attempts fall short and suggest the need for departure from these prior teachings to provide a successful bunk feeder utilizing a traveling hopper.

SUMMARY OF THE INVENTION

Accordingly, it is a primary object of the present invention to provide a livestock feeding apparatus employing a new concept for efficiently providing the feed to the feed bunk and overcoming the shortcomings of the prior art.

It is another object of the present invention to provide a livestock feeding apparatus utilizing a traveling hopper with a gate movable along a sliding path to assure efficient release and cut-off of the feed.

It is still another object of the present invention to provide a traveling hopper feeder wherein the gate for releasing the feed travels in an arcuate path providing smooth wiping and closing action to assure full closing with each cycle of operation.

It is another object of the present invention to provide a hopper mounted for movement along a feed bunk wherein the opening and closing of a bottom gate substantially enhances the even feeding to the feed bunk below and avoids the tendency for bridging and incomplete closing.

It is still another object of the present invention to provide a feeding apparatus wherein the traveling hopper includes a gate that closes rapidly to provide a clean cut-off during operation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved livestock feeding apparatus provides a continuous, even flow of feed along an elongated bunk positioned below. To accomplish this desired result, an elongated frame is positioned over the bunk and provided with suitable rails for mounting an elongated, traveling hopper of approximately one-half the length of the frame. A gate to control the flow of feed extends along substantially the full length of the bottom opening of the hopper. The hopper is driven along its path of travel between overlapping dump stations adjacent the two ends of the frame. Means for actuating the gate so as to travel along a novel sliding path is provided in accordance with the invention. The gate is efficiently opened and closed so that the feed is delivered to the bunk with a clean cut-off and substantially no feed in between due to the gate inadvertently remaining open.

Preferably, the gate moves at an angle to the longitudinal axis of the hopper and the path of movement, and more specifically along a pivoting arc. The arc is generated by a pair of pivotal support links with the pivot axis being substantially perpendicular to the bottom of the hopper and the plane of movement of the gate. The gate itself forms one side of a parallelogram linkage with the support links assuring that the gate opens evenly along its full length and is under tension, rather than compression as the gate is opened with the weight of the feed on top.

First and second cam wheels at the ends of the hopper engage centrally located corresponding first and second ramps. The ramps face in opposite directions for alternately actuating the gate precisely when the hopper arrives at the dump stations. The sudden release for rapid closing, feed cut-off and cleaning of the gate occurs as the wheels move up and over the cooperating ramp. The ramps are pivotally mounted for one-way operation to provide free pivoting release after closing of the gate and return movement of the hopper begins.

The plane of movement of the gate extends at a substantially 20° angle to the horizontal axis and a wiper is provided on the inside of the gate to efficiently clean the gate as it is opened and closed. The support links are extended to approximately one and one-half times the width of the gate to provide an extended arc of movement so as to enhance the slicing motion for clean cut-off, especially as the gate is closed.

The entire mechanism is adapted for low cost manufacturing and maintenance. The power requirements for operation are substantially reduced from the prior designs. Maximum power, comparable to the power in the earlier designs is required only twice during each cycle, that is, as the gate is opened. Since the gate extends at an angle and has sliding movement, the power utilized during this short period is minimized.

The feed conveyor provides in-feed at the mid-point of travel and the motor and driving sprocket, as well as the actuating means for the gate are all conveniently located at the mid-point. The driving sprocket engages a rack extending along the hopper further enhancing the low cost, low maintenance features of my design.

Reference will now be made in detail to the present preferred embodiment of the invention, an example of which is illustrated in the accompanying drawings.

BRIEF DESCRIPTION OF THE DRAWINGS

The accompanying drawings incorporated in and forming a part of the specification, illustrates several aspects of the present invention and together with the description serves to explain the principles of the invention. In the drawings:

FIG. 1 is an overall perspective view of the livestock feeder of the present invention with the traveling hopper;

FIGS. 4, 4a and 4b are top views of the feeding apparatus of the present invention with the hopper positioned at three separate locations, that is at the dump stations at the ends of travel and a mid-point in between;

FIGS. 8 and 8a are enlarged perspective views showing first from the left rear side, the cam wheel moving up and over the cam for opening the gate, and second from the right rear side showing the ramp being lifted for release of the cam wheel upon reversal of the hopper.

Figure 2:
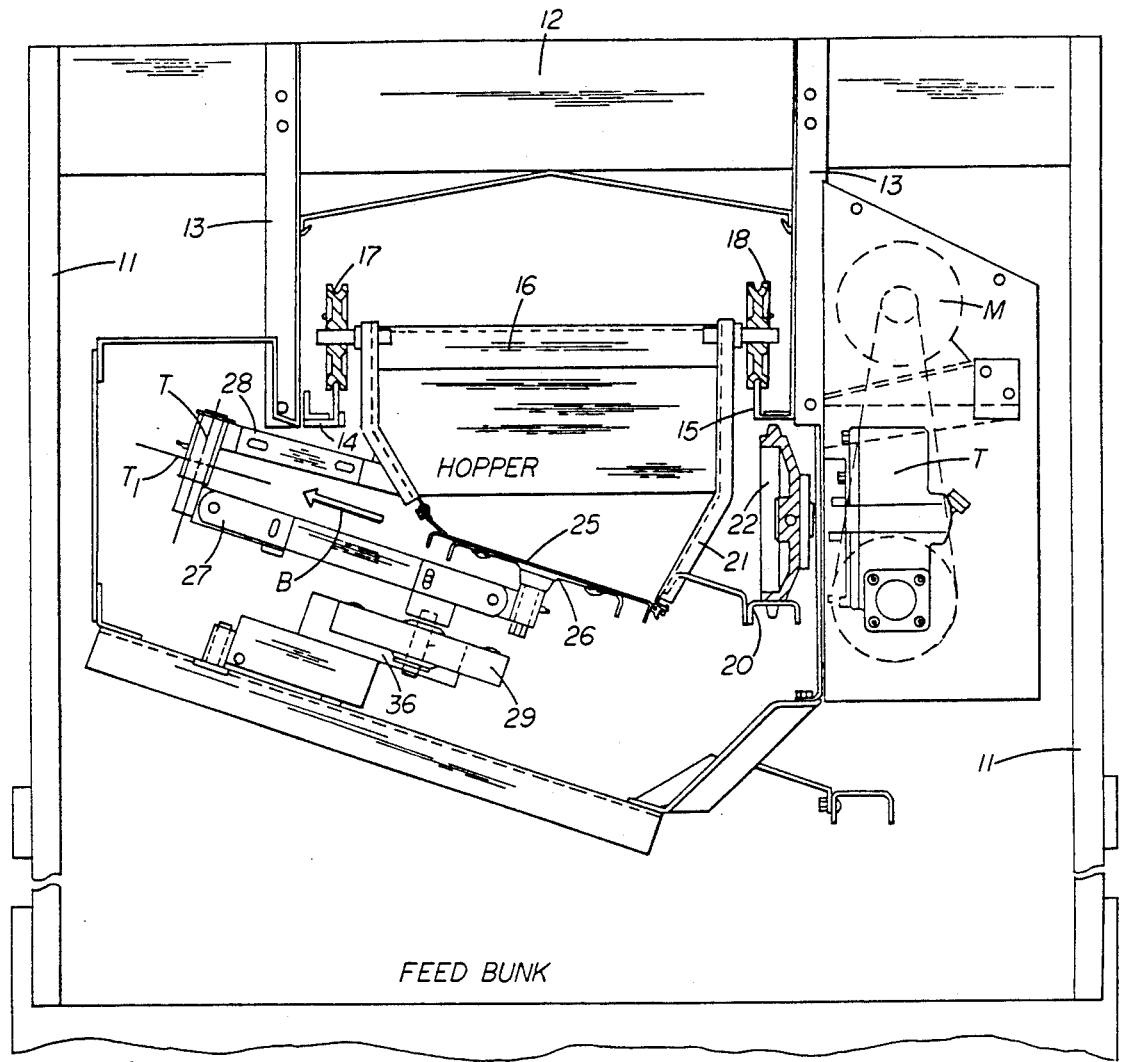
FIG. 2 is a cross-sectional view taken along a line at the center of the apparatus showing the major components including the hopper, drive means and the gate actuating means.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

DETAILED DESCRIPTION OF THE INVENTION

Reference is now made to FIG. 1 of the drawings wherein is shown an improved livestock feeder, generally designated by the reference numeral 10 and designed in accordance with the principles of the present invention. As is well known in the art, during feeding, the livestock approach the bunk from both sides. As shown, the feeder 10 is designed to provide a continuous, even flow of livestock feed F in an elongated bunk below. Thus, according to the invention, each animal is able to receive a full share of the feed F with minimum conflict and thus minimum stress.

The structure of the feeder 10 includes a frame having a plurality of vertical legs 11 and upper cross pieces 12. Supported by hangers 13 on the cross pieces 12 are a pair of rails 14, 15 (see FIG. 2). A traveling hopper 16, constructed in accordance with the present invention, is supported on the rails 14, 15 by support wheels 17, 18, respectively. The hopper is approximately one-half the length of the elongated frame and bunk.

Figure 4:
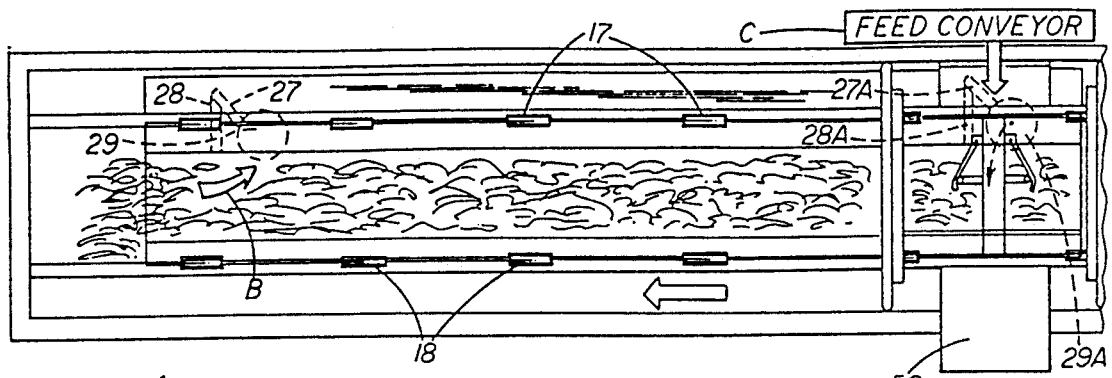
Figure 4A:
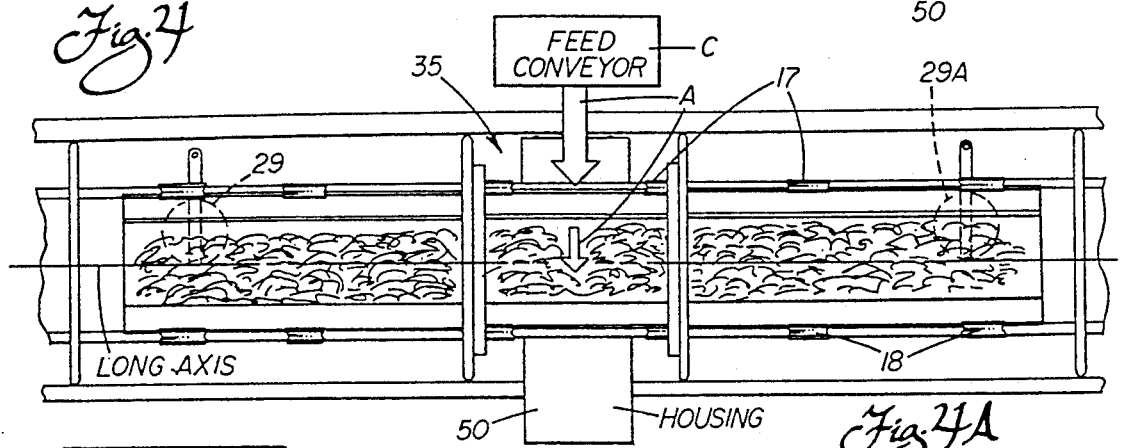
Figure 4B:
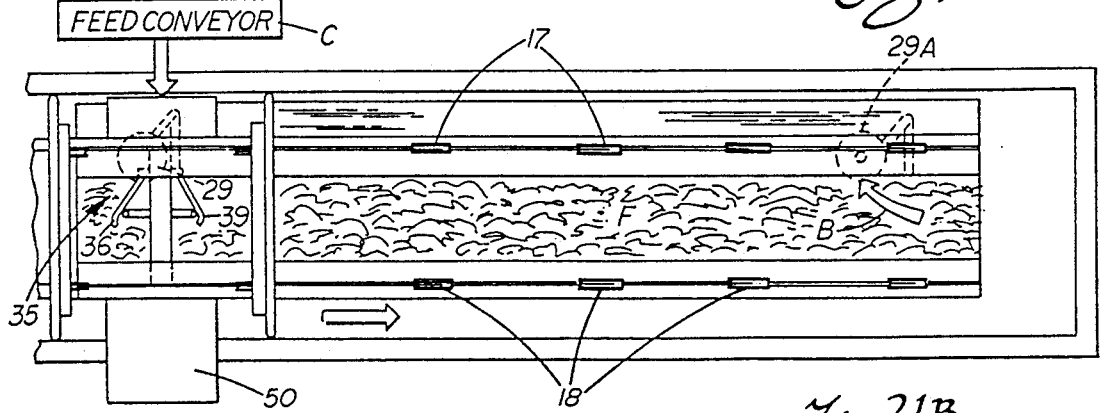

As the hopper 16 moves longitudinally along the rails 14, 15, there are two dump stations adjacent the two ends of the frame (see FIGS. 4 and 4b). In between is a mid-point position where feed conveyor C provides the feed F in a continuous operation. The conveyor C may be a conventional endless belt that takes the feed from silos (not shown) and delivers it to a chute at the midpoint, as denoted by the feed arrows A in FIG. 4a.

Figure 3:
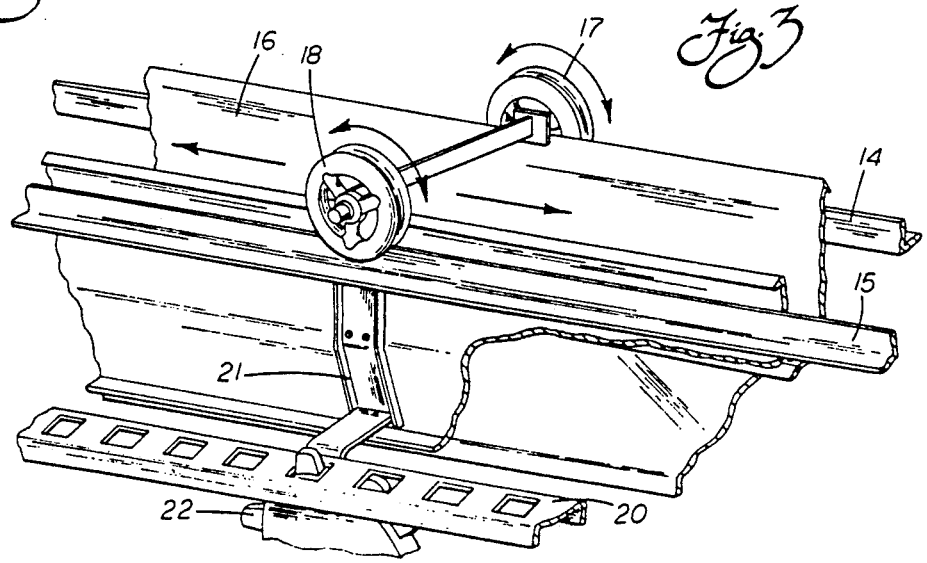
FIG. 3 is an enlarged perspective view showing the support wheels for the traveling hopper with the drive-back and pinion.

As best shown in FIGS. 2 and 3, the preferred means for driving the hopper 16 along the rails 14, 15 may take the form of a laterally extending rack 20 mounted on spaced L-shaped support arms 21 (see one support arm in FIGS. 2 and 3). A drive pinion 22 meshes with the rack 20 and is driven through a transmission T by a motor M.

Figure 7:
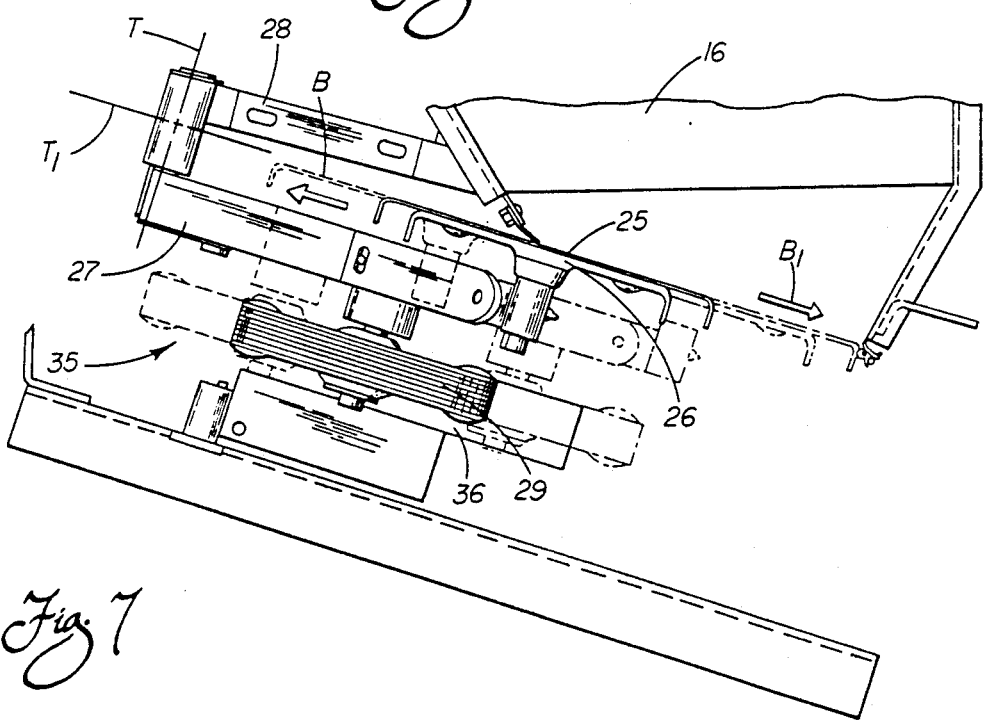
FIG. 7 is an enlarged cross-sectional view similar to FIG. 2 and showing the actuating linkage in more detail with multiple positions of the gate to open and close the bottom opening of the hopper.

The bottom portion of the hopper 16 has sloping sides and the bottom opening is closed by a gate 25. In accordance with the invention, and as shown in FIGS. 2 and 7, the gate 25 slides in accordance with the arrow B, and defines a plane of movement generally to the rear and upward of the hopper. The sliding movement is advantageous in order to allow controlled, even flow of the feed material out of the hopper 16 and rapid, even cutoff. From above, the gate 25 moves at an acute angle to the longitudinal axis of the hopper (note movement opening arrows B in FIG. 4 and 4b). Advantageously, and as will be seen more in detail later, the movement is actually along an arc defined by pivotal mounting of the gate 25, giving a curved, slicing motion.

With reference back to FIGS. 2 and 7, the gate 25 is mounted by a pair of plates 26 carried by pivoting support links 27, 27a (only one shown in FIGS. 2 and 7). The links 27, 27a can be seen at the opposite ends of the hopper 16 in FIG. 4 and are held by corresponding brackets 28, 28a (only one shown in FIGS. 2 and 7). The bracket 28, 28a provides the pivot for the corresponding support link 27, 27a (note the pivot axis T in FIG. 2). As will be realized, the pivot axis T is substantially perpendicular to the path of movement $T_1$ of the gate 25 (see FIG. 7).

Forming an integral part of the actuating means for the gate 25 is a pair of cam wheels 29, 29a (only one shown in FIGS. 2 and 7). The two cam wheels 29, 29a alternately actuate the gate 25 for opening and closing.

Positioned at the mid-point of travel of the hopper 16 is a cam assembly, generally designated by the reference numeral 35. As viewed from the top, two cam ramps 36, 37 are positioned in the path of travel of the cam wheels 29, 29a, respectively (see FIG. 6); the operative faces of the ramps being directed in opposite directions toward the ends of the feeder 10. As can be seen in FIGS. 2 and 7, the wheel 29 upon engaging operative face of the ramp 36, in turn lifts and pivots the link 27 when the hopper 16 moves to the right-hand dump station (see FIG. 4b). This action can be seen in perspective by viewing FIG. 8. Moving in the opposite direction to the left dump station (FIG. 4), the cam wheel 29a engages the ramp 37 and the gate 25 again opens. When the ramps 36, 37 are disengaged, the gate 25 closes.

Thus, it can now be seen generally how the gate 25 is actuated in a novel manner to travel along a sliding path B during opening and closing. The gate pivots about the stationary pivot axis T providing the arcuate movement, as shown in FIGS. 4 and 4b. The feed F is dumped at each dump station in a controlled fashion as the gate 25 slides upwardly and to the rear of the hopper 16. When the travel direction of the hopper 16 is reversed, the desired rapid closing action, as shown by arrow $B_1$ in FIG. 7 advantageously occurs. There is thus efficient dispensing of the feed F into the bunk, and a clean cut-off of any residual feed and closing of the gate 25 at the proper time. The friction against movement between the gate 25 and the feed F during opening is minimized. The tendency for residual feed to get caught is eliminated due to the proper release and the smooth sliding and slicing cut-off action of the gate 25.

Figure 5:
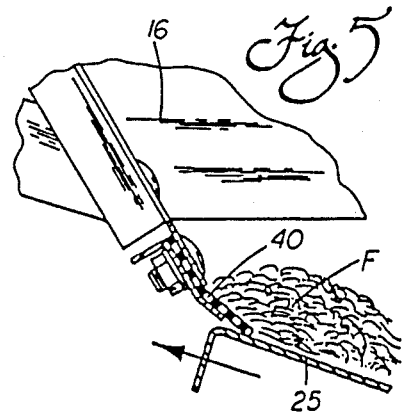
FIG. 5 is an enlarged detail view showing the back of the hopper and the wiper/seal engaging the hopper gate.

Proceeding now for a more complete review of additional details of the apparatus of the present invention, reference is made to FIG. 5 of the drawings wherein is shown a wiper 40 that engages the top surface of the sliding gate 25. As the gate is opened, the feed F is efficiently scraped from the top surface and efficiently released into the bunk below, as desired. Of course, the wiper 40 also forms an effective seal during the feeding and holding operation as the traveling hopper 16 moves from one end to the other. Smooth controlled release of the feed F during opening of the gate and cleaning is thus assured. Also, as the gate 16 is closed, the wiper 40 performs additional cleaning and scrubbing action to loosen any feed F that may be sticking to the gate surface.

Figure 5A:
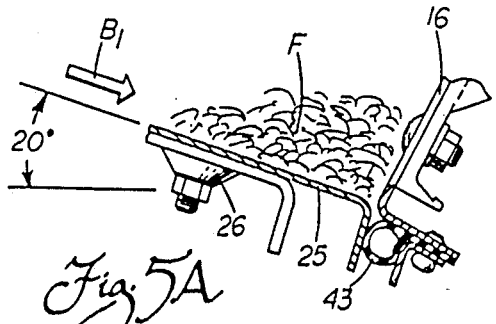
FIG. 5a is an enlarged cross sectional view showing the opposite side of the hopper with the gate sealed at the apex of the bottom opening.

As shown in FIG. 5a of the drawings, the gate 25 engages a bulbous cut-off seal 43 at the bottom apex of the hopper 16. As the gate 25 moves to close (see arrow $B_1$), the seal 43 is engaged and helps absorb the shock. The rapid closing motion generated by gravity assures that the gate 25 firmly closes and that bridging of the feed is prevented. If a stray piece or residual feed happens to become trapped in the seal 43, it is locally deformed allowing the integrity of the overall sealing action to be maintained.

Advantageously, as shown in FIG. 5a, the gate 25 extends at an angle of approximately 20 degrees to the plane including the longitudinal axis of the hopper 16. This angle assures that the gate 25 can close in response to gravity as the gate is released from the ramps 36, 37, as previously discussed. If necessary, an additional spring means can be added to assure the rapid closing and the clean cut-off of the residual feed.

Figure 6:
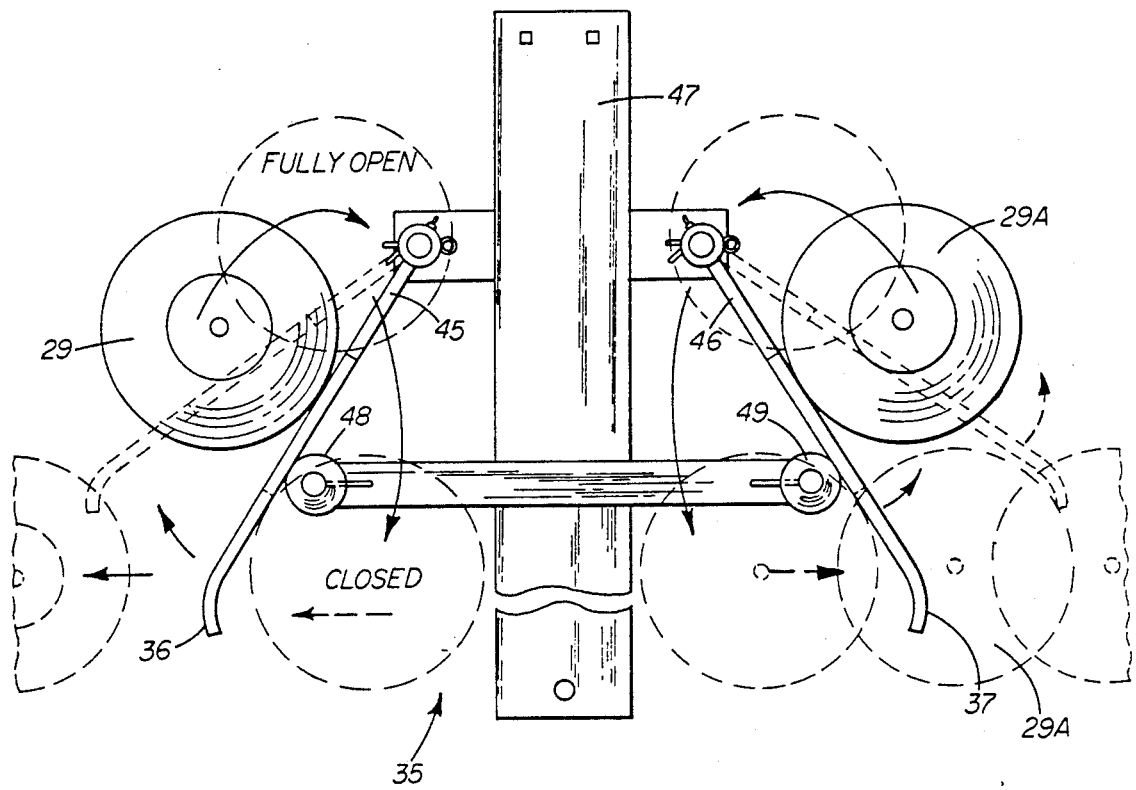
FIG. 6 is an enlarged detail view of the actuating cams illustrating the cam wheels moving in engagement therewith.

By viewing FIGS. 2, 6, and 7, a more detailed understanding of the cam assembly 35 can be obtained. The cam ramps 36, 37 are integrally mounted on swinging base members 45, 46, respectively. The pivot pins supporting the base members 45, 46 are mounted on a cross piece of inclined support bar 47. An additional cross piece mounts stops 48, 49 for the ramps 36, 37, respectively (see also FIGS. 8, 8a).

FIGS. 6 and 8 show the particular sequence of movement of the cam wheel 29. In the left hand full line position, the cam wheel 29 is moving up the ramp 36 acting against the stop 48, and the gate 25 is being opened by sliding, curved motion. At the upper dotted line position of the wheel 29, the gate is fully open. As the cam wheel 29 then moves over the top of the ramp 36, it drops rapidly by gravity to the lower dotted line position resulting in the desired rapid closing of the gate. At this point, the hopper 16 is reversed and the cam wheel 29 lifts the cam 36 to allow the return of the hopper 16 (see FIG. 8a).

Similar action is shown in the sequence of movement of the cam wheel 29a on the opposite or right hand side of FIG. 6. In this case, the ramp 37 held by stop 49 supports the movement of the cam wheel 29a as it moves to the upper dotted line position. Once the wheel 29a goes over center and drops to the lower dotted line position, the gate closes rapidly terminating any residual flow. As the hopper 16 is then reversed, the ramp 37 is lifted free of the stop 49 to release the cam wheel 29a.

It can be realized that the cam wheel 29, 29a that is trailing in the direction of movement of the hopper 16 is the one that is operative to engage the corresponding ramp, 36, 37. This means that the opening of the gate 25 is accomplished by parallelogram action including the pair of support links 27, 27a and the gate 25. In essence, when either trailing cam wheel is engaged, it pulls the leading cam wheel along the same arc by connection through the gate 25. Since the gate is assured of being in tension during this entire opening movement, it can be fabricated of relatively thin material (see FIGS. 5 and 5a). When the gate is moving to the closed position (see arrow $B_1$ in FIG. 5a), the movement is due to gravity, and thus minimal or no compression forces are acting between the two links 27, 27a.

Also as will now be recognized, the cam assembly 35 is preferably positioned at the mid-point of the travel of the hopper 16 (see FIG. 4a). Similarly, the motor and transmission are positioned at the mid-point under housing or cover 50 (see FIG. 4a). It is at this mid-point that the conveyor C is also located. As a result of this compact location of all the key operating mechanisms in one area, manufacturing and maintenance of the entire apparatus is significantly reduced. The stress at the ends of the feeder apparatus is minimal reducing the need of reinforcement in these areas. Also, due to the novel cam wheel and ramp cooperation for actuation of the sliding gate 25, the power requirements for operation are substantially reduced. The maximum power is required only twice during each cycle as the gate is opened with the hopper 16 positioned at one of the dump stations. This peak power is comparable to the constant power required in earlier active conveyor designs for overcoming the high friction loads between the feed and the trough. With the preferred inclined angle and with the preferred sliding movement, even the power utilized during the short opening period is minimized and additional substantial savings are identified.

In summary, the livestock feeder 10 with the traveling hopper 16 operated in accordance with the principles of the present invention provides substantial enhanced results and advantages over the prior art. The feed F is efficiently and continuously delivered in an even manner to the hopper 16, and alternately deposited at the two overlapping dump stations adjacent the ends of the bunk (see FIGS. 4 and 4b). To dump the feed F, the gate 25 moves along a sliding path in response to the cam wheels 29, 29a moving up and over the corresponding ramps 36, 37. The operative cam wheels 29, 29a are mounted on respective pivotal support links 27, 27a on the trailing end of the hopper 16 so that smooth, parallelogram motion of the gate 25 is obtained. The feed F is thus released in a controlled fashion for even distribution along the entire feed bunk. Once the cam wheel 29, 29a goes over the top of the ramp 36, 37, it rapidly drops by gravity to provide a corresponding rapid closing of the gate 25 and a clean cut-off of any residual feed. The key operating mechanisms are all mounted adjacent the mid-point of the hopper movement for maximum efficiency.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

What is claimed is:

1. A livestock feeding apparatus to provide a continuous flow of feed to an elongated bunk, comprising:
   an elongated frame over said bunk;
   rail means extending along said frame;
   an elongated hopper of approximately one-half the length of said frame and supported thereon;
   a gate along substantially the full length and width of the bottom of said hopper to retain the feed;
   means for driving the hopper along a path of travel between overlapping dump stations adjacent the two ends of the frame, and
   means for actuating said gate to travel along a single sliding path during opening and closing;
   whereby the feed is efficiently delivered to the bunk at the dump stations with a clean cut-off and substantially no feed in between.

2. The livestock feeding apparatus of claim 1 wherein is provided a feed conveyor adjacent the mid-point of said path of travel of said hopper providing a substantially continuous flow of feed at the point of overlap of the dump stations, and said driving means including a motor and driven sprocket adjacent said mid-point engaging a rack extending along the length of said hopper.

3. A livestock feeding apparatus to provide a continuous flow of feed to an elongated bunk, comprising:
   an elongated frame over said bunk;
   rail means extending along said frame;
   an elongated hopper of approximately one-half the length of said frame and supported thereon;
   a gate along substantially the full length of the bottom of said hopper to retain the feed;
   means for driving the hopper along a path of travel between overlapping dump stations adjacent the two ends of the frame; and
   means for actuating said gate to travel along a sliding path during opening and closing, said actuating means including means for mounting said gate for movement at an acute angle to the longitudinal axis of said hopper,
   whereby the feed is efficiently delivered to the bunk at the dump stations with a clean cut-off and substantially no feed in between.

4. The livestock feeding apparatus of claim 3 wherein said mounting means provides movement of said gate along an arc.

5. The livestock feeding apparatus of claim 4 wherein said mounting means includes at least a pair of pivotal support links for said gate, the pivot axis of said links being substantially perpendicular to the bottom of said hopper and the plane of movement on said gate.

6. The livestock feeding apparatus of claim 5 wherein said gate is mounted to the distal end of said support links and forming one side of a parallelogram linkage.

7. The livestock feeding apparatus of claim 4 wherein said actuating means includes first and second cam wheels carried by said mounting means adjacent the ends of the hopper and ramp means adjacent the center of the travel path for engaging said wheels to open and close said gate.

8. The livestock feeding apparatus of claim 7 wherein said ramp means includes first and second ramps corresponding to said wheels and facing in opposite directions for alternately actuating said gate.

9. The livestock feeding apparatus of claim 8 wherein said driving means is operative to move said wheels up and over the cooperating ramp for opening and to provide sudden release for rapid closing.

10. The livestock feeding apparatus of claim 8 wherein said ramps are pivotally mounted for one-way operation for opening and free pivoting release after closing and return movement of the hopper.

11. The livestock feeding apparatus of claim 5, wherein said support links are approximately one and one-half times the width of said gate to provide an extended arc of movement.

12. The livestock feeding apparatus of claim 3 wherein said gate and the sliding path of movement extends at a substantially constant angle to the longitudinal axis of the hopper.

13. The livestock feeding apparatus of claim 12 wherein said angle is approximately 20°.

14. The livestock feeding apparatus of claim 13 wherein said angle extends toward one side of said hopper, and wiper means on said one side for cleaning the gate during opening and closing movement.

15. The livestock feeding apparatus of claim 3 wherein said mounting means allows said gate to close in response to gravity.

16. A livestock feeding apparatus to provide a continuous flow of feed to an elongated bunk, comprising:
   an elongated frame over said bunk;
   rail means extending along said frame;
   an elongated hopper of approximately one-half the length of said frame and supported thereon;
   a gate along substantially the full length of the bottom of said hopper to retain the feed;
   means for driving the hopper along a path of travel between overlapping dump stations adjacent the two ends of the frame; and
   means for actuating said gate to travel along a sliding path during opening and closing, said actuating means including means for mounting said gate for movement at an acute angle to the longitudinal axis of said hopper, first and second cam wheels carried by said mounting means adjacent the ends of the hopper and ramp means adjacent the center of the travel path for engaging said wheels to open and close said gate,
   whereby the feed is efficiently delivered to the bunk at the dump stations with a clean cut-off and substantially no feed in between.

* * * * *

UNITED STATES PATENT OFFICE
CERTIFICATE OF CORRECTION

Patent No. 5,022,348             Dated June 11, 1991

Inventor(s) Gerald J. Bruecker and Robert W. Smith

It is certified that error appears in the above-identified patent and that said Letters Patent is hereby corrected as shown below:

In column 4, line 22, delete the word "back"

and insert the word -- rack --.

Signed and Sealed this

Twenty-sixth Day of January, 1993

Attest:

STEPHEN G. KUNIN

*Attesting Officer*    Acting Commissioner of Patents and Trademarks